United States Patent [19]

Hagan

[11] Patent Number: 5,052,543
[45] Date of Patent: Oct. 1, 1991

[54] METHOD AND APPARATUS FOR POSITIONING WORK OBJECTS

[75] Inventor: James C. Hagan, Stockton, Calif.

[73] Assignee: Hagan Electronics International, Stockton, Calif.

[21] Appl. No.: 412,408

[22] Filed: Sep. 26, 1989

[51] Int. Cl.⁵ .............................................. B65G 47/24
[52] U.S. Cl. ..................................... 198/387; 198/396; 198/785
[58] Field of Search ............... 198/382, 387, 394, 396, 198/407, 780, 781, 785, 790, 861.3

[56] References Cited

U.S. PATENT DOCUMENTS

| | | | |
|---|---|---|---|
| 2,296,645 | 9/1942 | Marsden | 198/387 |
| 3,304,973 | 2/1967 | Norris | 198/396 X |
| 3,426,881 | 2/1969 | Dwyer | 198/396 X |
| 3,768,627 | 10/1973 | Anderson | 198/396 X |
| 3,794,161 | 2/1974 | Peterson | 198/387 X |
| 3,857,472 | 12/1974 | Klint | 198/387 X |
| 4,421,222 | 12/1983 | Stuermer | 198/382 |
| 4,747,480 | 5/1988 | Wedler et al. | 198/396 |
| 4,819,783 | 4/1989 | Pinyan et al. | 198/382 X |

FOREIGN PATENT DOCUMENTS

| | | | |
|---|---|---|---|
| 1282550 | 11/1968 | Fed. Rep. of Germany | 198/785 |
| 2315770 | 10/1973 | Fed. Rep. of Germany | 198/387 |
| 0031417 | 2/1985 | Japan | 198/785 |
| 0460846 | 4/1975 | U.S.S.R. | 198/382 |

Primary Examiner—Robert P. Olszewski
Assistant Examiner—James R. Bidwell
Attorney, Agent, or Firm—Worrel & Worrel

[57] ABSTRACT

An apparatus for positioning work objects having a frame adopted to receive the work objects and to direct them along a course, a plurality of work members mounted on the frame in position for engagement by the work objects in the course, and a drive mechanism for rotating the work members while in engagement with the work objects to propel the work objects along the course and substantially into single file with the longitudinal axes thereof disposed in substantially coaxial alignment.

10 Claims, 4 Drawing Sheets

METHOD AND APPARATUS FOR POSITIONING WORK OBJECTS

BACKGROUND OF THE INVENTION

1. Field of the Invention

The present invention relates to a method and apparatus for positioning work objects and more particularly to a method and apparatus which are particularly well suited to orienting irregularly shaped work objects which are individually elongated along a longitudinal axis, such as, for example, vegetables, fruit and the like.

2. Description of the Prior Art

The processing and handling of fungible goods, and particularly goods which are received in bulk, are irregularly shaped and yet which are elongated along a longitudinal axis, present particular difficulties. These difficulties reside in the fact that the goods must be properly positioned for handling if such processing and handling is to be effectively accomplished. Thus, for such purposes as cleaning, grading, sizing and packing, it is desirable and, in the case of some equipment, essential that the products be separated from each other and disposed in a given orientation in which the handling equipment is designed to receive the product.

These problems are particularly acute in the processing and handling of fruits, vegetables and the like which possess a seemingly infinite variety of configurations and sizes, but must be passed through cleaning, grading, sizing and packing equipment, preferably in single file and in particular orientations. In the case of such crops as potatoes, irregularities of size and shape common in all varieties of potatoes make such processing and handling unusually difficult. Heretofore, the equipment adapted for the purpose of positioning such work objects has only been marginally successful. Conventional devices for so positioning work objects include those having belts of progressively greater velocity, vibrating conveyors and successive product drop points. The objective of such equipment is to separate the products from each other, and in some cases, to orient them in particular attitudes. Not only has such prior art equipment been inadequate, at best, in achieving these objectives, but characteristically they damage the product causing bruising, abrading and peeling thereof. The result is that the processing and handling equipment receiving the product has not been able to function at an optimum level and therefore cleaning, grading, sizing and packing of the product has been less than satisfactory and the product has been damaged.

Therefore, it has long been known that it would be desirable to have a method and apparatus for positioning work objects having particular utility in handling randomly oriented, irregularly shaped work objects individually elongated along longitudinal axes and received in bulk, operable individually to separate and orient the work objects so that they can be received by processing and handling equipment in a known orientation with little or no variation therefrom to permit such equipment to operate to its maximum efficiency and reliability and without the problems associated with prior art equipment.

SUMMARY OF THE INVENTION

Therefore, it is an object of the present invention to provide an improved method and apparatus for positioning work objects.

Another object is to provide such a method and apparatus which are particularly well suited to receiving and positioning fungible goods which are received in random orientation, which are irregularly shaped and which are individually elongated along longitudinal axes.

Another object is to provide such a method and apparatus which have particular operative advantages when employed in the orienting of fruits and vegetables including kiwi fruit, potatoes, cucumbers and the like.

Another object is to provide such an apparatus which possesses a simplicity of structure and dependability of operation permitting it to operate virtually unattended in the handling of a wide variety of types of work objects and in complete capability with existing processing and handling equipment.

Another object is to provide such an apparatus which performs its positioning operation on each work object expending the minimum of mechanical energy and insulating the work objects from damage.

Another object is to provide such an apparatus which can be adjusted to increase or decrease the influence of gravity upon the performance of its positioning operation so as to maximize the benefit associated therewith.

Another object is to provide a method which is capable of dependably orienting a wide variety of work objects and can be employed dependably with a minimum of attention and energy.

Another object is to provide such an apparatus which is operable to receive randomly oriented work objects in bulk, separate the work objects from each other, direct the work objects toward a predetermined path of travel, move the work objects along the path of travel in single file and urge the work objects individually into orientations wherein their respective longitudinal axes are substantially aligned with the path of travel.

Further objects and advantages are to provide improved elements and arrangements thereof in an apparatus for the purposes described which is dependable, economical, durable and fully effective in accomplishing its intended purposes.

These and other objects and advantages are achieved in the method and apparatus of the present invention which, in the preferred embodiment, employ a plurality of work members mounted on a frame and disposed for engagement by the work object to be positioned passing along a course and drive means for moving the work members While an engagement with the work objects to propel the work objects along the course and individually into the orientation desired.

DESCRIPTION OF THE PREFERRED EMBODIMENT

Figure 1:
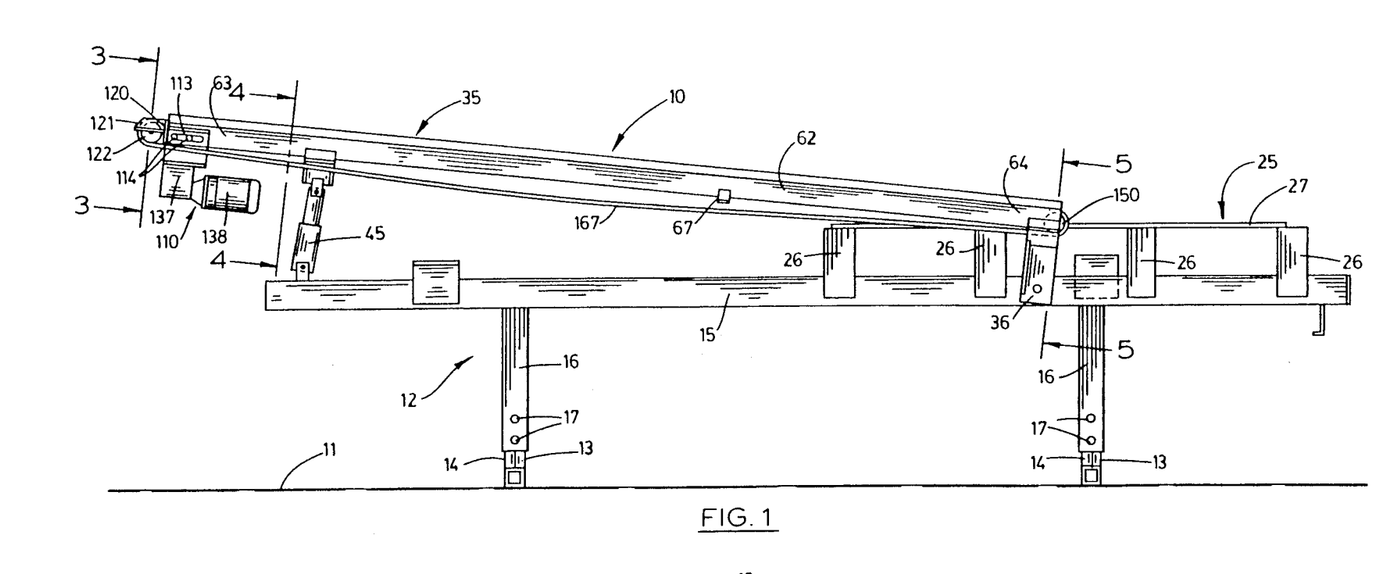
FIG. 1 is a side elevation of the apparatus of the present invention adapted for practicing the method of the present invention.

Referring more particularly to the drawings, the apparatus of the present invention is generally indicated by the numeral 10 in FIG. 1. As shown therein the apparatus is disposed on a supporting surface 11 in rested relation. The apparatus has a main frame 12 including a pair of tee shaped supports 13. Each of the tee shaped supports has a tubular upright 14. The main frame has a main beam 15 extending in horizontal relation and having a pair of downwardly extending tubular supports 16. The tubular uprights 14 of the tee shaped supports 13 are slidably received in the tubular supports 16 and locked in position using mounting pins 17 so as to support the main beam 15 in spaced substantially parallel relation to the supporting surface 11.

As will hereinafter become more clearly apparent, the apparatus 10 of the present invention is adapted to be employed in receiving relation to a source of work objects deposited thereupon and in discharging relation to other equipment such as a transferring conveyor, cleaning equipment, grading equipment, sizing equipment, packing equipment or the like. For this purpose, a transfer frame 25 is mounted on the main beam 15 on the right as viewed in FIG. 1. The transfer frame has a plurality of vertical supports 26 mounting a support plate 27 extending horizontally in substantially parallel relation to the main beam above the tee shaped support 13 on the right as viewed in FIG. 1. The transfer frame is adapted to serve as a support for precise interconnection and alignment of the apparatus with handling equipment which receives the work objects once oriented by the apparatus of the present invention.

A secondary frame 35 is mounted on the main frame 12 on a pivot assembly 36 on the right as viewed in FIG. 1. The pivot assembly includes a pair of supports 37, best shown in FIG. 5, which are individually mounted on the main beam 15 on the right as viewed in FIG. 1 by bolts 38. Each of the supports 37 has a support plate 39 extending therefrom in diverging relation and having upper surfaces 40. In the preferred embodiment the upper surfaces 40 are preferably disposed at an angle of one hundred and thirty five (135) degrees to each other. However, a range of angles can be employed.

Figure 4:
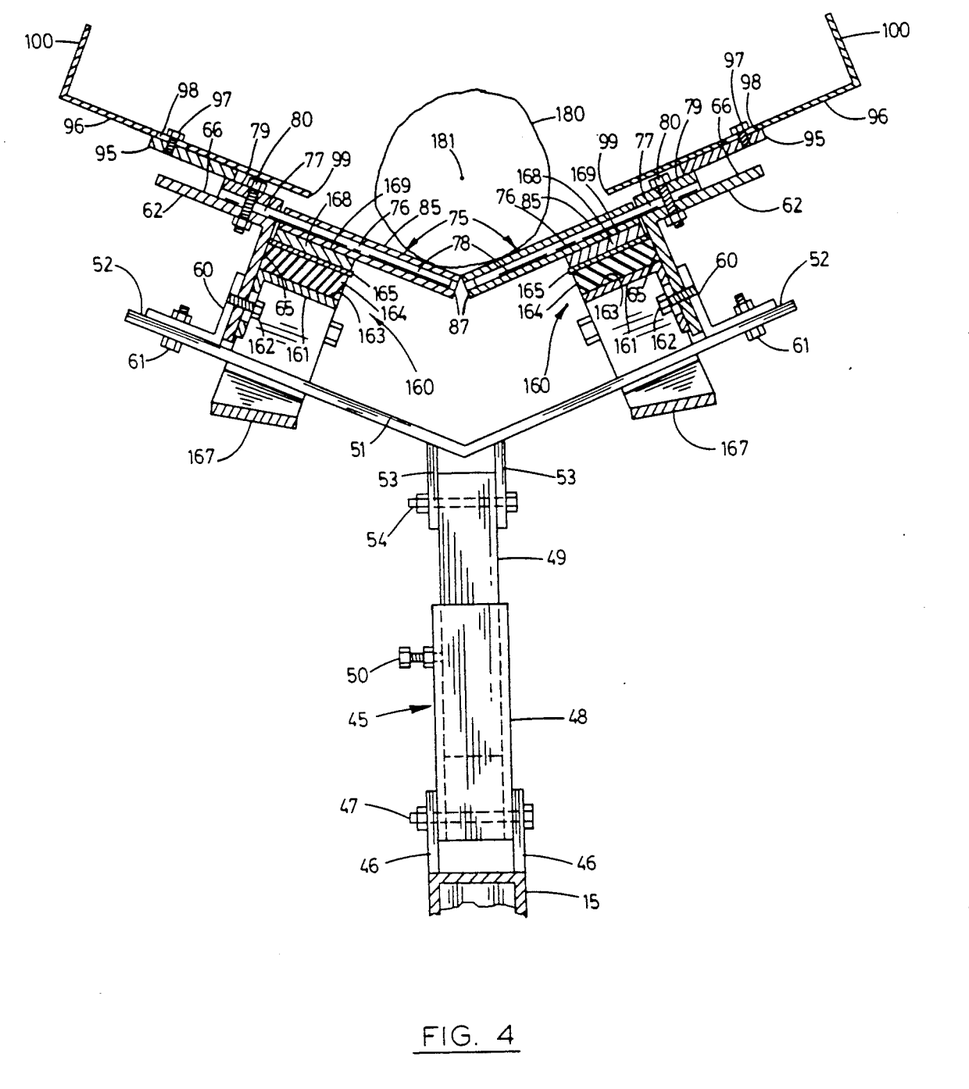
FIG. 4 is a somewhat enlarged, fragmentary, transverse, substantially vertical section taken on line 4—4 in FIG. 1.

The opposite end of the secondary frame 35 is mounted on the main frame 12 by an adjustment assembly 45 best shown in FIGS. 1 and 4. The adjustment assembly includes a pair of mounting flanges 46 mounted on the main beam 15 in upstanding relation. A bolt and nut assembly 47 mounts a female sleeve 48 on and between the mounting flanges 46 in upstanding relation. A male sleeve 49 is slidably received in the female sleeve 48. A locking pin 50 is screw-threadably received in the female sleeve for binding engagement with the male sleeve therewithin. Thus, locking pin can be loosened and the sleeves 48 and 49 adjusted relative to each other to adjust the adjustment assembly 45 as to length for purposes hereinafter to be described.

A support plate 51, having upper surfaces 52 disposed at oblique angles corresponding to the angle of the upper surfaces 40 of the support plates 39 of the pivot assembly 36, has downwardly extending mounting flanges 53. The mounting flanges of the support plate are mounted on the male sleeve 49 by a bolt and nut assembly 54 extending therethrough, as shown in FIG. 4.

Figure 5:
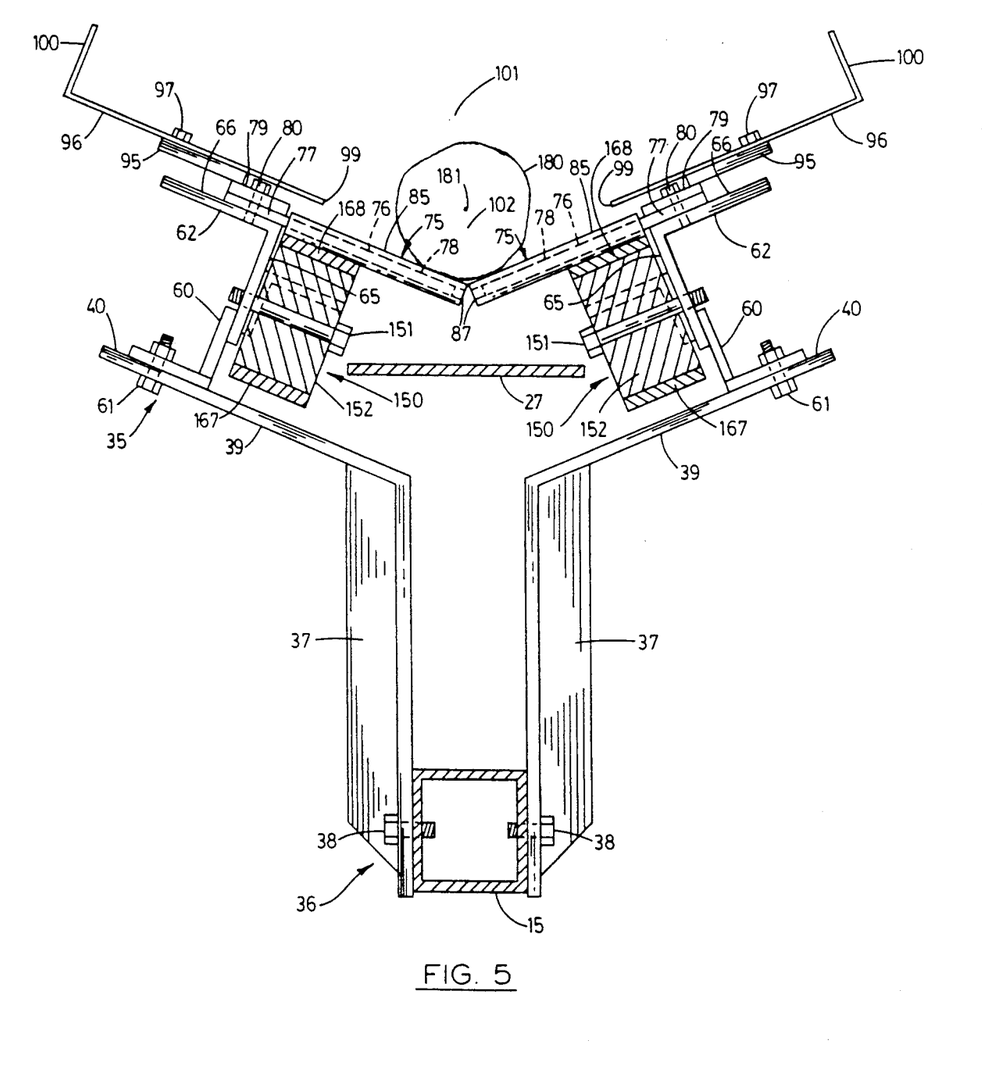
FIG. 5 is a somewhat enlarged, fragmentary, transverse, substantially vertical section taken on line 5—5 in FIG. 1.

Brackets 60 are individually mounted on the upper surfaces 40 of the support plates 39 and the upper surfaces 52 of the support plate 51 by bolt and nut assemblies 61, as best shown in FIGS. 4 and 5. A pair of angle iron frame members 62 are mounted by welding on the brackets 60 extending in spaced, substantially parallel relation from the pivot assembly 36 to and beyond the adjustment assembly 45. The angle iron frame members have upper end portions 63 and opposite lower end portions 64. The adjustment assembly is preferably so adjusted as to support the frame member 62 extended at an angle of approximately six (6) degrees from horizontal from the pivot assembly 36 to the adjustment assembly 45. However, it will be understood that the adjustment assembly is operable, using the locking pin 50 to adjust the angle thereof to a greater or lesser incline than the preferred incline of six (6) degrees. In fact, the angle of six (6) degrees has been found to be optimum for some work objects but other angles are better suited to other types of work objects. For example, an angle of thirty (30) degrees has been found to be optimum for potatoes. The frame members have interior surfaces 65 facing toward each other and upper surfaces 66 facing upwardly. A brace assembly 67 interconnects the frame members 62 so as to assist in holding them in rigid, spaced, substantially parallel relation and so that the upper surfaces 66 thereof are disposed at the desired angle relative to each other, in the case of the preferred embodiment an angle of approximately one hundred and thirty five (135) degrees.

Figure 2:
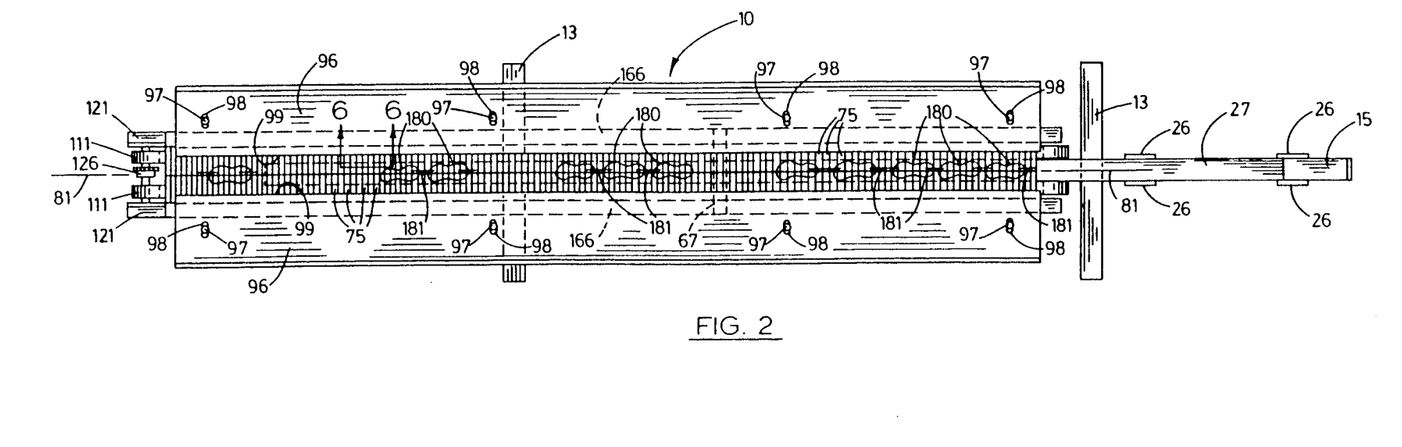
FIG. 2 is a top plan view of the apparatus of FIG. 1.

The frame members 62 mount a plurality of work members or roller assemblies 75. Each of the roller assemblies includes a cylindrical shaft 76 having a mounting portion 77 and a roller portion 78. Each cylindrical shaft is preferably, although not necessarily, constructed of stainless steel. The cylindrical shafts 76 are mounted on their respective frame members 62 in sets by mounting plates 79 extending over the mounting portions 77 thereof and secured in position by nut and bolt assemblies 80 interconnecting each mounting plate with its respective frame member to clamp the mounting portions 77 of the shafts therebetween. The cylindrical shafts of each set are thus secured in spaced substantially parallel relation on the upper surface 66 of the frame member and thereby disposed at the same angle relative to the cylindrical shafts 76 of the opposite set of one hundred and thirty five (135) degrees. As can best be seen in FIG. 2, each mounting shaft is aligned, with a corresponding cylindrical shaft 76 of the opposite set, transversely of a longitudinal axis 81 for the apparatus shown in FIG. 2

Figure 6:
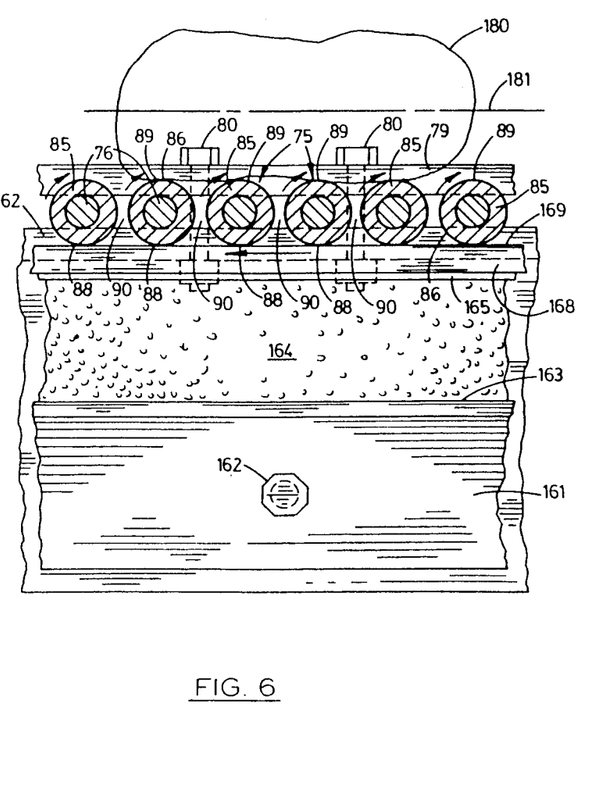
FIG. 6 is a somewhat further enlarged, fragmentary, longitudinal, vertical section taken on line 6—6 in FIG. 2.

A roller or sleeve 85 is slidably received on the roller portion 78 of each cylindrical shaft 76. Each roller sleeve has outer peripheral surface 86 and an open terminal end 87. The roller sleeves are slidably received on their respective shafts and retained in position thereon from gravitational displacement by abutment of the terminal ends 87 of corresponding roller sleeves of the opposite sets of cylindrical shafts 76 previously described. For purposes of describing the operation of the roller assemblies, it will be understood, as can best be visualized in FIG. 6, that each roller sleeve has a lower surface 88 and an upper surface 89 at any one time. The roller assemblies are spaced from each other sufficiently to define individual spaces 90 between adjoining roller assemblies. The roller sleeves are preferably constructed of a material having a low coefficient of friction, such as ultra high molecular weight plastic.

Figure 3:
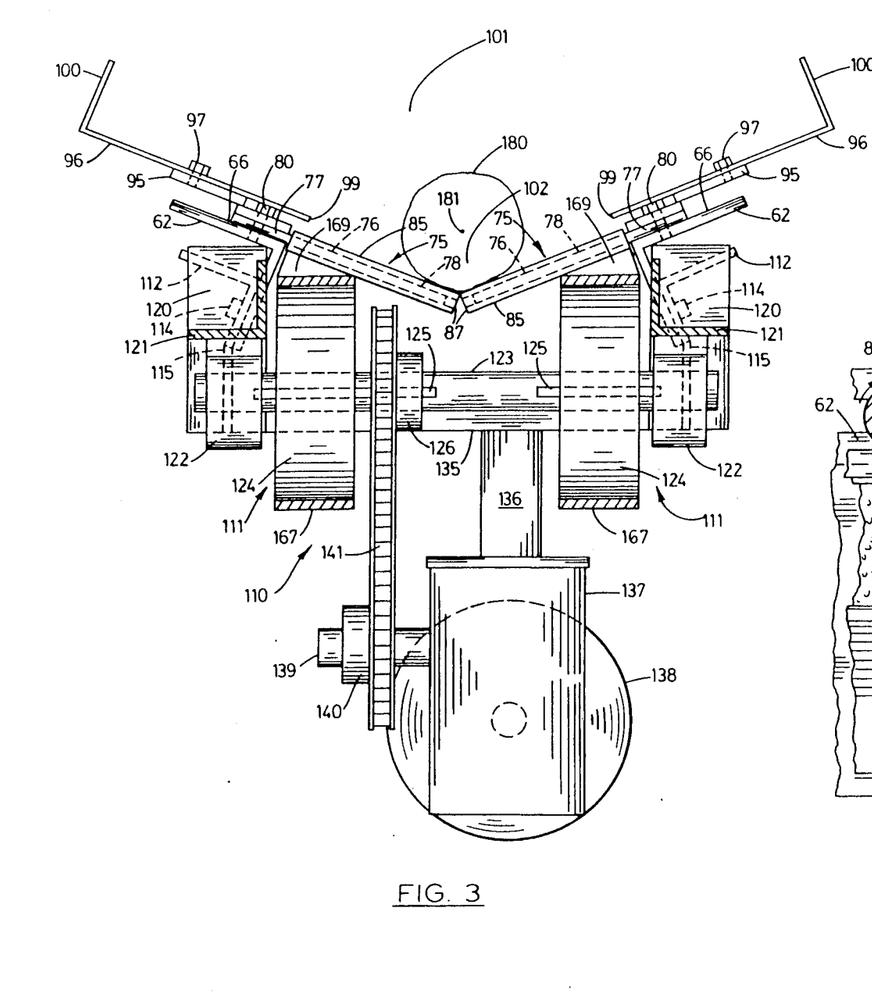
FIG. 3 is a somewhat enlarged, transverse, substantially vertical section taken on line 3—3 in FIG. 1.

A plurality of brackets 95 are mounted on the mounting plates 79 extending outwardly therefrom as best shown in FIGS. 3, 4 and 5. A wall member 96 is mounted on the brackets 95 of each mounting plate 79 by bolts 97 extending through adjustment slots 98 to mount the wall members in covering relation to the mounting plates. Each wall member has an interior edge 99 which is preferably adjusted using the bolts and adjustment slots so that the inner edge 99 overhangs the roller sleeves 85 on its respective side of the apparatus and as best shown in FIGS. 2, 3, 4 and 5. Each wall member has an outer wall 100 extending upwardly therefrom to define a chamber 101 which, in effect, feeds a trough 102 defined by the roller assemblies 75.

The apparatus 10 has a drive assembly generally indicated by the numeral 110 in FIG. 1. The drive assembly includes a pair of drive belt assemblies 111 hereinafter to be described in greater detail. A slide plate 112, having a slot 113, is mounted on the upper end portion 63 of each frame member 62 by mounting bolts 114. Thus, it will be seen that by loosening the mounting bolts 114 the slide plate can be repositioned along its respective frame member 62 and the mounting bolts again tightened into position to secure the slide plate in the newly selected position. Each slide plate has a lower vertical portion 115 which extends downwardly from the slide plate to a vertical attitude beneath the slide plate.

A back plate 120 is mounted on each slide plate 112 and the lower vertical portion 115 thereof as by welding. A bearing mount 121 is weldably secured on each back plate 120 so as to extend inwardly from the upper end portion 63 of its respective frame member 62. A bearing 122 is mounted on each bearing mount and the respective bearings, in turn, mount a drive shaft 123 extending therebetween and thereby mounted for rotational movement about a substantially horizontal axis. A pair of drive pulleys 124 are mounted on the drive shaft in spaced relation secured in position by a key, not shown, received in a key way 125 in the drive shaft. A sprocket 126 is mounted on the drive shaft by a key, not shown, received in the key way 125.

A cross beam 135 is mounted on and interconnects the lower vertical portions 115 of the slide plates 112. A motor mount 136 is mounted, as by welding, on the cross beam extending downwardly therefrom and mounting a transmission 137 thereon. A drive motor 138 is mounted on the transmission in driving relation thereto. A drive shaft 139 extends laterally from the transmission and in turn mounts a sprocket 140 in vertical alignment with the sprocket 126 thereabove. A drive chain 141 is extended about the sprockets 126 and 140 in driving relation. Thus, it will be seen that operation of the drive motor causes the drive shaft 123 to be driven in rotational movement in the bearings 122 through the intermediary of the transmission 137, and the drive chain 141.

A pair of idler pulley assemblies 150 are individually mounted on the lower end portion 64 of the frame member 62. Each of the idler pulley assemblies includes a mounting shaft 151 mounted on the lower end portion of its respective frame member and rotationally mounting an idler pulley 152.

A drive belt support assembly 160 is mounted on each frame member 62 as can best be seen in FIG. 4. Each drive belt support assembly includes an angle iron mounting beam 161 which is mounted by mounting bolts 162 on the interior surface 65 of each frame member 62. The mounting bolts extend through slots in the mounting beam so as to permit the mounting beam to be adjusted toward or from the roller assemblies and tightened into the selected position by tightening the mounting bolts. Each mounting beam has an upper surface 163 on which is mounted, as by adhesive, a filter foam cushion 164 extending the entire length thereof. In the preferred embodiment, the foam cushion is of a type that retains its shape, such as No. 10 open sponge rubber or the like. A slide plate 165 is adhesively mounted on the upper surface of the filter foam cushion 164. The slide plate is preferably constructed of a metal, such as stainless steel, having a low coefficient of friction. A drive belt 166 is entrained about each drive pulley 124 and its corresponding idler pulley 152. Each drive belt has a lower run 167 and an upper run 168. The upper run has an upper surface 169. As can be seen in FIG. 4, the upper run of each drive belt is rested on and slides along its respective slide plate 165. The upper surface of the drive belt preferably has a red gum rubber surface or the like having a relatively high coefficient of friction. The upper surface of the upper run contacts the lower surfaces 88 of the roller sleeves 85, as can best be seen in FIG. 6. In that the drive belts have relatively high coefficients of friction, movement of the upper surface of the upper run of each belt against its respective roller sleeves 85, causes those roller sleeves to be rotated about their respective cylindrical shafts 76. The drive assembly 110 rotates the drive belts 166 in a counterclockwise direction, as viewed in FIG. 1. As can best be visualized in FIG. 6, such counterclockwise movement causes the roller sleeves 85 to be rotated in clockwise directions, as viewed therein, toward the lower end portions 64 of the frame members 62. The preferred surfaces speeds of the roller sleeves is up to 250 feet per minute.

OPERATION

The operation of the described embodiment of the subject invention is believed to be clearly apparent and is briefly summarized at this point.

As previously noted, the apparatus 10 is adapted for use with a wide variety of work object processing and handling equipment. In the illustrative embodiment of the method and apparatus shown and described herein, the apparatus is employed in positioning or orienting potatoes 180. Such orientation places the potatoes in single file aligned in such a fashion that their respective longitudinal axes 181 are disposed in substantial alignment with each other and with the direction of movement. The potatoes so arranged can then be received and properly handled by equipment thereafter so as to maximize the speed, efficiency and effectiveness with which such equipment can operate.

The potatoes 180 are deposited from a supply thereof such as a hopper, conveyor or the like in randomly oriented, bulk fashion into the chamber 101 defined by the outer walls 100 of the wall members 96 at the upper end portion of the apparatus on the left as viewed in FIG. 1. The wall members 96 gravitationally direct the potatoes toward and into the trough 102 defined by the roller assemblies 75. Because of the length of the apparatus and the effectiveness with which it operates, the potatoes can be so deposited in bulk at the upper end portion of the apparatus and will be oriented in the desired manner by the time they reach the lower end of the apparatus on the right as viewed in FIG. 1. It has been found that the potatoes are substantially individually separated from the bulk pile and carried down the apparatus while being oriented. Typically, the bulk pile does not travel down the apparatus as a unit.

The drive assembly 110 is operated as previously described to drive the drive belts 166 in a counterclockwise direction as viewed in FIG. 1. Contact of the upper surfaces 169 of the upper runs 168 of the drive belts, as viewed in FIG. 6, causes the roller sleeves 85 to be rotated in a clockwise direction as viewed therein and thus toward the lower end of the apparatus. The potatoes are thus motivated by gravity toward the longitudinal axis 81 of the apparatus and by gravity toward the lower end of the apparatus. As the potatoes come into contact with the roller assemblies 75, it has been found that the roller sleeves 85 thereof, having low coefficients of friction, gradually move the potatoes toward the bottom of the trough 102 defined by the roller assemblies. The potatoes, contacted by roller assemblies on both sides thereof, are moved to the point that their longitudinal axes 181 are placed in substantial alignment with the longitudinal axis 81 of the apparatus. It has also been found that this process causes the potatoes to "singulate" in such a fashion that they are placed in single file in this orientation by the time they reach the lower end of the apparatus.

All of the foregoing is accomplished without in any way bruising, abrading, peeling or otherwise damaging the potatoes because of the low coefficient of friction of the roller sleeves 85 about their respective cylindrical shafts 76.

As previously described, the apparatus 10 is operable with a wide variety of work objects to perform the function heretofore described. The invention hereof is not to be limited in any fashion to any particular work objects.

Therefore, the method and apparatus for positioning work objects of the present invention dependably and efficiently operates to position randomly disposed work objects, such as potatoes, cucumbers, kiwi fruit and any irregularly shaped or other work objects elongated along longitudinal axes, operates cooperatively with other processing and handling equipment permitting it to receive the work objects in bulk in random orientation and to deliver such work objects in single file with their longitudinal axes aligned substantially with the course of movement thereof and into processing or handling equipment adapted for such functions as cleaning, grading, sizing, packing or the like, and does so all without damage of any type to the work objects during such positioning.

Although the invention has been herein shown and described in what is conceived to be the most practical and preferred embodiment, it is recognized that departures may be made therefrom within the scope of the invention which is not to be limited to the illustrative details disclosed.

Having described my invention, what I claim as new and desire to secure by Letters Patent is:

1. An apparatus for positioning irregularly shaped work objects individually having substantially longitudinal axes, the apparatus comprising a frame adapted to receive said work objects and to direct the work objects along a course; a plurality of rollers mounted on the frame in a pair of juxtaposed sets on opposite sides of said course in position for engagement by said work objects in said course and so mounted on the frame as to be rotatable about individual axes substantially transversely related to said course and having terminal ends not spaced from each other a distance permitting any substantial portions of said work objects to pass therebetween; and means for moving said rollers while in engagement with the work objects to propel the work objects along said course and into individual orientations wherein the longitudinal axes of the work objects are substantially aligned with each other and with said course.

2. An apparatus for positioning work objects comprising a frame adapted to receive said work objects and to direct the work objects along a course, a plurality of work members mounted on the frame in position for engagement by said work objects in said course, each of said work members having a shaft with a roller received thereon for rotation thereabout, said shafts mounted on the frame substantially normal to said course and in two sets sloped downwardly toward each other to define a trough, said rollers slidably received on their respective shafts and the shafts so arranged in said sets that each roller is captured on its respective shaft by abutted engagement with a corresponding roller on a shaft of the opposite set of shafts; and means for moving said work members while engagement with the work objects to propel the work objects along said course and into predetermined positions, said moving means including a pair of belts individually engaging the rollers of said sets of shafts driven to rotate the rollers about their respective shafts.

3. The apparatus of claim 2 wherein said belts individually engage the rollers of said sets on undersides thereof to rotate the rollers about their respective shafts.

4. An apparatus for positioning work objects individually elongated along longitudinal axes, the apparatus comprising a frame having a pair of frame members mounted in spaced substantially parallel relation to each other and extending downwardly at an angle from upper end portions to lower end portions; a plurality of shafts mounted on said frame members in individual sets, the shafts within each set disposed in side-by-side relation and disposed substantially at right angles to a longitudinal axis of said apparatus constituting a course for said work objects extending along the frame and the shafts in one of said sets individually disposed in substantial alignment with corresponding shafts of the other set transversely of said longitudinal axis of the apparatus and defining an angle therewith; a plurality of substantially cylindrical rollers individually rotationally received on the shafts of said sets wherein each roller is retained on its respective shaft by abutted engagement with the corresponding roller on the corresponding shaft of the opposite set whereby the rollers of said sets define a trough aligned with said course; a pair of drive belts entrained on the frame having upper runs individually extending along the rollers of both sets of shafts in frictional engagement therewith; and means for driving said drive belts to move the upper runs thereof toward the upper end portions of said frame members to rotate the rollers of said sets about their respective shafts whereby work objects deposited on the rollers adjacent the upper end portions of the frame members are motivated along said course toward the lower end portions of the frame members and are, during said movement, individually maneuvered into orientations in which their respective longitudinal axis are disposed in substantial alignment with said longitudinal axis of the apparatus and disposed in substantially single file relation in the trough.

5. The apparatus of claim 4 wherein each of said shafts has a portion about which its respective roller is received and a mounting portion and each of said sets of shafts is mounted on its respective frame member by the mounting portions thereof being captured between its respective frame member and a secondary plate overlaying the mounting portions of the shafts and held in clamping engagement therewith by a plurality of fastening means interconnecting said secondary plate and the frame member.

6. The apparatus of claim 4 wherein wall members are mounted on the frame above and laterally disposed relative to said trough to define a chamber for receiving said work objects in randomly disposed attitudes for feeding into said trough.

7. The apparatus of claim 4 wherein the frame includes a main frame, said frame members are mounted at their respective lower end portions on the main frame in substantially pivotal relation about a substantially horizontal axis and an adjustment assembly interconnects the main frame and said upper end portions of the frame members and is operable selectively to pivot said frame members about said horizontal axis to adjust said angle of the frame members from the upper end portions thereof to the lower end portions thereof.

8. The apparatus of claim 4 including a guide plate individually mounted on each frame member beneath its respective set of shafts having an upper surface disposed substantially parallel to the longitudinal axes of the shafts and means are borne on said upper surface of the guide plate for resiliently urging the upper course of its respective drive belt into driving engagement with the rollers of the shafts.

9. The apparatus of claim 8 wherein said urging means includes a resilient pad affixed on said upper surface of the guide plate and a slidable plate affixed on the pad and engaging the under side of the upper run of the drive belt to capture said upper run between the slide plate and the rollers in driving relation to the rollers.

10. An apparatus for positioning work objects individually elongated along longitudinal axes, the apparatus comprising a frame extending downwardly at an angle from an upper end portion to a lower end portion; a plurality of shafts mounted on the frame in a pair of juxtaposed sets, the shafts within each set disposed in side-by-side relation and disposed substantially at right angles to a longitudinal axis of said apparatus constituting a course for said work objects extending along the frame with corresponding shafts in said sets defining an angle; a plurality of substantially cylindrical rollers, having outer surfaces of a material having a low coefficient of friction, individually received on the shafts for rotation thereabout, the rollers of corresponding shafts in said pair of juxtaposed sets having terminal ends not spaced from each other a distance permitting any substantial portion of said work objects to pass therebetween; and means for driving the rollers of said sets about their respective shafts whereby work objects deposited on the rollers adjacent to the upper end portion of the frame move along said course toward the lower end portion of the frame and are, during said movement, individually maneuvered into orientations in which their respective longitudinal axes are disposed in substantial alignment with said longitudinal axis of the apparatus and disposed in substantially single file relation.

* * * * *

UNITED STATES PATENT AND TRADEMARK OFFICE
CERTIFICATE OF CORRECTION

PATENT NO. : 5,052,543
DATED : October 1, 1991
INVENTOR(S) : JAMES C. HAGAN

It is certified that error appears in the above-identified patent and that said Letters Patent is hereby corrected as shown below:

Column 2, line 49, the "W" in "While" should be lower case.

Column 3, line 57, after "Thus," insert ---the---.

Column 4, line 41, the "W" in "With" should be lower case.

Column 8, line 65, delete "axis" and substitute ---axes---.

Column 10, line 3, delete "slidable" and substitute ---slide---.

Signed and Sealed this

Sixteenth Day of February, 1993

Attest:

STEPHEN G. KUNIN

*Attesting Officer*   *Acting Commissioner of Patents and Trademarks*